United States Patent
Ishikawa et al.

(10) Patent No.: US 10,928,276 B2
(45) Date of Patent: Feb. 23, 2021

(54) BLOCKAGE DETECTION DEVICE AND BLOCKAGE DETECTION METHOD

(71) Applicant: HONDA MOTOR CO., LTD., Tokyo (JP)

(72) Inventors: Hiroki Ishikawa, Wako (JP); Michinori Tani, Wako (JP); Ikue Habu, Wako (JP); Daijiro Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 154 days.

(21) Appl. No.: 16/190,853

(22) Filed: Nov. 14, 2018

(65) Prior Publication Data
US 2019/0145857 A1 May 16, 2019

(30) Foreign Application Priority Data
Nov. 16, 2017 (JP) .............................. JP2017-220869

(51) Int. Cl.
*F02M 25/08* (2006.01)
*G01M 15/09* (2006.01)

(52) U.S. Cl.
CPC .......... *G01M 15/09* (2013.01); *F02M 25/089* (2013.01); *F02M 25/0818* (2013.01)

(58) Field of Classification Search
CPC ............ F02M 25/089; F02M 25/0809; F02M 25/0818; F02M 25/0827
USPC ..................................................... 73/114.39
See application file for complete search history.

(56) References Cited

U.S. PATENT DOCUMENTS

| | | | |
|---|---|---|---|
| 9,303,600 B2 | 4/2016 | Kato | |
| 10,495,030 B1* | 12/2019 | Dudar | F02M 25/0854 |
| 2006/0016253 A1 | 1/2006 | Kobayashi et al. | |
| 2013/0184963 A1 | 7/2013 | Jackson et al. | |
| 2018/0017022 A1* | 1/2018 | Murata | G01M 3/025 |
| 2019/0078976 A1* | 3/2019 | Nelson | G01M 3/26 |
| 2019/0120716 A1* | 4/2019 | Murata | G01M 3/2876 |

FOREIGN PATENT DOCUMENTS

| | | |
|---|---|---|
| JP | 2006-037752 A | 2/2006 |
| JP | 2014-077401 A | 5/2014 |

OTHER PUBLICATIONS

Office Action dated Dec. 15, 2020, issued over the corresponding Japanese Patent Application No. 2017-220869 with the English translation thereof.

* cited by examiner

*Primary Examiner* — Eric S. McCall
(74) *Attorney, Agent, or Firm* — Carrier Blackman & Associates, P.C.; Joseph P. Carrier; Anne G. Sabourin

(57) ABSTRACT

A blockage detection device opens a purge valve in a state where a negative pressure pump is operated. The negative pressure pump is connected to a downstream side of a canister with respect to a fuel tank, and reduces pressure in a device internal space. The blockage detection device calculates gas information (volume V, for example) of the device internal space on the basis of variation of internal pressure before and after the purge valve is opened. The blockage detection device detects a blockage in a vent line using the calculated gas information.

7 Claims, 14 Drawing Sheets

WHEN FUEL LEAK AND BLOCKAGE IN VENT LINE ARE DETECTED

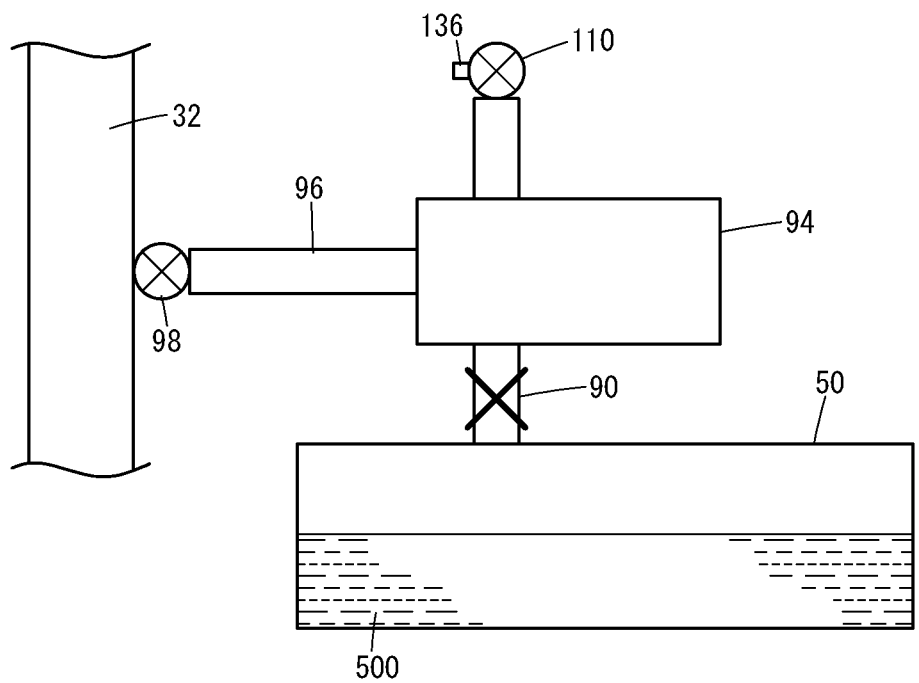

BLOCKAGE DETECTION DEVICE AND BLOCKAGE DETECTION METHOD

CROSS-REFERENCE TO RELATED APPLICATION

This application is based upon and claims the benefit of priority from Japanese Patent Application No. 2017-220869 filed on Nov. 16, 2017, the contents of which are incorporated herein by reference.

BACKGROUND OF THE INVENTION

Field of the Invention

The present invention relates to a blockage detection device and a blockage detection method that detect a blockage in a vent line connecting a fuel tank and a canister.

Description of the Related Art

U.S. Patent Application Publication No. 2013/0184963 (abstract) discloses a system for a vehicle including a first pressure module and a blockage notification module. The first pressure module receives a signal from a pressure sensor that measures pressure in a fuel gas purge system. The first pressure module generates first pressure (second initial pressure) on the basis of the signal at a first timing. In addition, in a state where a vacuum pump 134 is operated ([0035]), the first pressure module generates second pressure (second final pressure) on the basis of the signal at a second timing that is after a predetermined time from the first timing ([0037]). The blockage notification module notifies whether a blockage has occurred between the pressure sensor and a fuel tank in the fuel gas purge system on the basis of a difference between the first pressure and the second pressure ([0038]).

SUMMARY OF THE INVENTION

As described above in U.S. Patent Application Publication No. 2013/0184963, it is determined whether the blockage has occurred between the pressure sensor and the fuel tank on the basis of the difference between the first pressure (second initial pressure) at the first timing and the second pressure (second final pressure) at the second timing that is after the predetermined time from the first timing (abstract, [0035], [0037], [0038]). The predetermined time appears to be a fixed value.

If the predetermined time is too short, the significant pressure difference cannot be detected so that detection accuracy may be reduced. On the other hand, if the predetermined time is too long in the case where the predetermined time is a fixed value, the pressure is reduced excessively so that the durability of a fuel storage device (or vent line, for example) may be affected.

The present invention has been made in consideration of the above problem and an object is to provide a blockage detection device and a blockage detection method that can improve at least one of the blockage detection accuracy and the durability.

A blockage detection device for detecting a blockage in a vent line of a fuel storage device according to the present invention is provided, and the fuel storage device includes: a fuel tank; a canister; the vent line configured to connect the fuel tank and the canister; a purge line configured to connect the canister and an intake system of an internal combustion engine and purge volatile fuel from the fuel tank or the canister to the intake system; a purge valve provided in the purge line; a pressure detector configured to detect internal pressure corresponding to pressure in a device internal space that is a space including the fuel tank, the vent line, and the purge line; and a negative pressure pump connected to a downstream side of the canister with respect to the fuel tank, and configured to reduce the pressure in the device internal space, wherein the blockage detection device is configured to: open the purge valve in a state where the negative pressure pump is operated; calculate gas information of the device internal space on a basis of variation of the internal pressure before and after the purge valve is opened; and detect the blockage in the vent line using the calculated gas information.

In the present invention, the purge valve is opened in the state where the pressure in the device internal space is reduced by the negative pressure pump. Then, the blockage in the vent line is detected using the gas information of the device internal space that is calculated based on the internal pressure before and after the purge valve is opened. Thus, the blockage in the vent line can be detected using the gas information that is based on the internal pressure that is restored. Note that by using the internal pressure when restored, it is relatively easy to distinguish whether the blockage in the vent line has occurred. Therefore, the blockage in the vent line can be detected with high accuracy.

In the pressure restored state, it is relatively easy to distinguish whether the blockage in the vent line has occurred. Therefore, it can be detected whether the blockage in the vent line has occurred even when the pressure in the device internal space is reduced relatively weakly. Thus, when it is detected whether the blockage in the vent line has occurred at the pressure that is reduced relatively weakly, the durability of the fuel storage device (or vent line, for example) can be enhanced.

In addition, the negative pressure pump is operated before and after the purge valve is opened in the state where the pressure in the device internal space is reduced. Thus, the negative pressure pump can be operated even after the purge valve is opened. Therefore, the fluid that flows from the intake system or the outside to the device internal space due to the opening of the purge valve has less influence on the negative pressure pump.

As the gas information, for example, the flow rate or the volume of the device internal space, or the variation of the internal pressure itself may be used.

The blockage detection device may be configured to: calculate a volume of the device internal space on the basis of the variation of the internal pressure before and after the purge valve is opened; and detect the blockage in the vent line using the calculated volume.

The blockage detection device may be configured to; have the gas information reflect influence of an operation of the negative pressure pump after the purge valve is opened; and detect the blockage in the vent line using the gas information which reflects the influence. Thus, even when the negative pressure pump is operated after the purge valve is opened, the blockage in the vent line can be detected with high accuracy.

The blockage detection device may be configured to detect the blockage in the vent line while the internal combustion engine is stopped. Thus, when the pressure in the intake system of the internal combustion engine is positive and the pressure in the fuel storage device is negative (reduced pressure), the blockage in the vent line can be detected. Therefore, in the pressure restored state of the device internal space, the variation of the internal pressure becomes large; thus, the blockage in the vent line can be detected with high accuracy.

The pressure detector may be disposed between the canister and the negative pressure pump. If the pressure detector is disposed between the canister and the negative pressure pump, the detection accuracy of the pressure detector to detect the internal pressure may be deteriorated due to the pressure loss of the canister or the like. In the present invention, by using the variation of the internal pressure in the pressure restored state of the device internal space, the blockage in the vent line is detected. Thus, even if the pressure detector is disposed between the canister and the negative pressure pump, the blockage in the vent line can be detected with high accuracy.

The blockage detection device may further include: a discharging speed calculation unit configured to calculate discharging speed of an internal fluid when the negative pressure pump is operated; an elapsed time calculation unit configured to calculate elapsed time for the pressure in the vent line to change from a second pressure value to a first pressure value; and a volume calculation unit configured to calculate a volume of the device internal space on a basis of the variation of the internal pressure before and after the purge valve is opened, the discharging speed, and the elapsed time. Thus, the volume of the device internal space can be calculated with the simple method.

In a blockage detection method for detecting a blockage in a vent line of a fuel storage device, the fuel storage device including: a fuel tank; a canister; the vent line configured to connect the fuel tank and the canister; a purge line configured to connect the canister and an intake system of an internal combustion engine and purge volatile fuel from the fuel tank or the canister to the intake system; a purge valve provided in the purge line; a pressure detector configured to detect internal pressure corresponding to pressure in a device internal space that is a space including the fuel tank, the vent line, and the purge line; and a negative pressure pump connected to a downstream side of the canister with respect to the fuel tank, and configured to reduce the pressure in the device internal space, the blockage detection method includes: a gas information calculation step of opening the purge valve in a state where the negative pressure pump is operated, and calculating gas information of the device internal space on a basis of variation of the internal pressure before and after the purge valve is opened; and a blockage detection step of detecting the blockage in the vent line using the calculated gas information.

By the present invention, at least one of the blockage detection accuracy and the durability can be improved.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is a diagram for describing an outline of vent line blockage diagnosis control according to the embodiment;

DESCRIPTION OF THE PREFERRED EMBODIMENTS

A. Embodiment

A-1. Configuration

[A-1-1. Overall Configuration]

Figure 1:
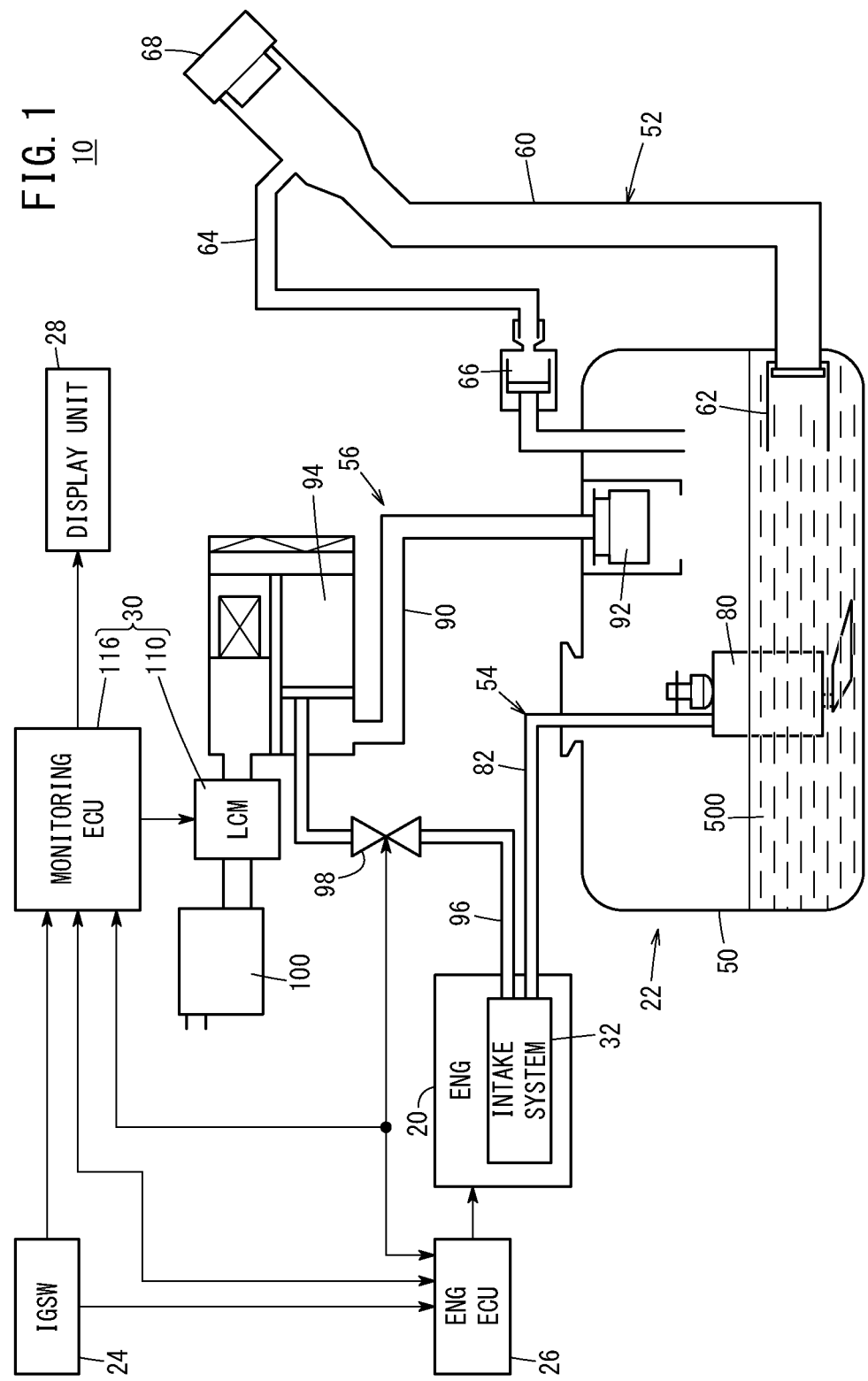
FIG. 1 illustrates a schematic configuration of a vehicle including a vent line monitoring device as a blockage detection device according to one embodiment of the present invention.

FIG. 1 illustrates a schematic configuration of a vehicle 10 including a vent line monitoring device 30 (hereinafter, also referred to as "monitoring device 30") as a blockage detection device according to one embodiment of the present invention. The vehicle 10 includes, in addition to the monitoring device 30, an engine 20, a fuel storage device 22, an ignition switch 24 (hereinafter, referred to as "IGSW 24"), an engine electronic control unit 26 (hereinafter, referred to as "engine ECU 26" or "ENG ECU 26"), and a display unit 28. The fuel storage device 22 stores a liquid corresponding to volatile fuel (for example, gasoline) of the vehicle 10. The fuel storage device 22 includes a fuel tank 50 (fluid container), a fuel filling mechanism 52, a fuel supply mechanism 54, and a gas discharge mechanism 56.

[A-1-2. Fuel Filling Mechanism 52]

The fuel filling mechanism 52 (hereinafter, also referred to as "filling mechanism 52") is a mechanism to fill the fuel tank 50 (hereinafter, also referred to as "tank 50") with fuel 500 from the outside. The filling mechanism 52 includes a filler pipe 60 (fluid guide unit), a fuel filling valve mechanism 62, a breather line 64, a first rollover valve 66, and a fuel cap 68. The first rollover valve 66 is automatically closed when the vehicle 10 rolls over (overturns).

[A-1-3. Fuel Supply Mechanism 54]

The fuel supply mechanism 54 is a mechanism to supply the fuel 500 from the tank 50 to the engine 20. The fuel supply mechanism 54 includes a pump 80 and a pipe 82 (feed line). The pump 80 feeds the fuel 500 to the engine 20 through the pipe 82 on the basis of an instruction from the engine ECU 26.

[A-1-4. Gas Discharge Mechanism 56]

The gas discharge mechanism 56 is a mechanism to discharge the fuel 500 (gas fuel) in the tank 50 that has been gasified (or evaporated) from the tank 50 and feed the fuel 500 to an intake system 32 of the engine 20. As illustrated in FIG. 1, the gas discharge mechanism 56 includes a first pipe 90 (hereinafter, referred to as "vent line 90"), a second rollover valve 92, a canister 94, a second pipe 96 (hereinafter, referred to as "purge line 96"), a purge valve 98, and a dust filter 100.

The vent line 90 connects the fuel tank 50 and the canister 94, and moreover connects the canister 94 and a leak check module 110 of the vent line monitoring device 30. Air in the fuel storage device 22 is discharged through the vent line 90. The second rollover valve 92 is automatically closed when the vehicle 10 rolls over (overturns).

The canister 94 includes activated carbons 102a, 102b, 102c (FIG. 10B), and adsorbs the gasified fuel 500. The purge line 96 connects the canister 94 and the intake system 32, and moreover purges the volatile fuel from the fuel tank 50 or the canister 94 to the intake system 32. The purge valve 98 according to the present embodiment is used for control of internal pressure Pi of an internal space 300 (FIG. 8A) including the fuel tank 50, the vent line 90, and the purge line 96 (positive pressure control), and for control of pressure (negative pressure) when the fuel 500 that is adsorbed in the canister 94 is sucked into the engine 20 side (negative pressure control).

The purge valve 98 according to the present embodiment is a solenoid valve corresponding to a regulation valve whose angle can be controlled by the engine ECU 26 or the like. The purge valve 98 is hereinafter also referred to as a PCS valve 98. PCS stands for a purge control solenoid.

[A-1-5. Vent Line Monitoring Device 30]

(A-1-5-1. Outline of Vent Line Monitoring Device 30)

Figure 2:
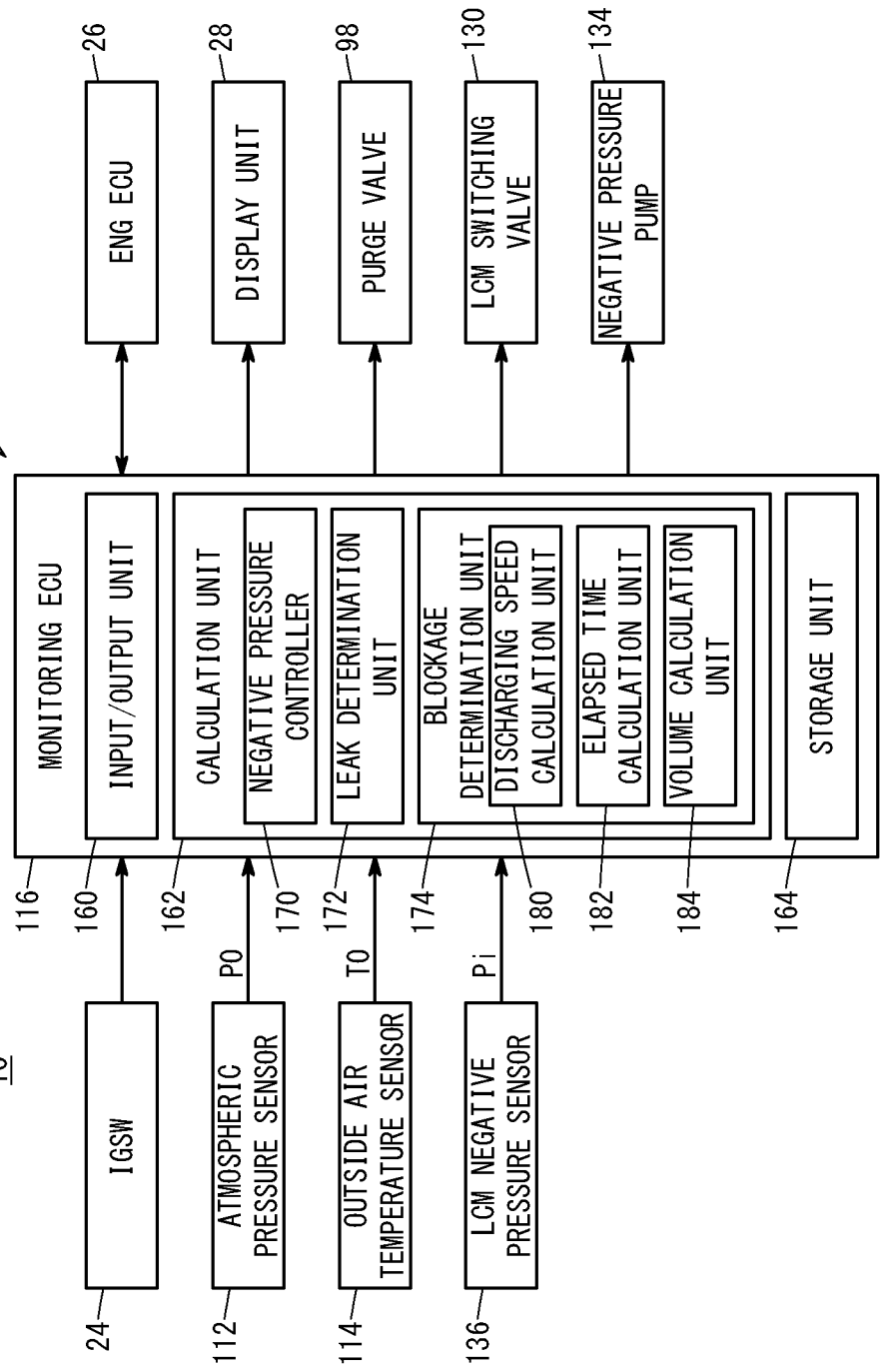
FIG. 2 is a block diagram illustrating a control system of the vent line monitoring device according to the embodiment.

FIG. 2 is a block diagram illustrating a control system of the vent line monitoring device 30 according to the present embodiment. The vent line monitoring device 30 monitors a leak of the fuel 500 and a blockage in the vent line 90. The monitoring device 30 includes the leak check module 110 (FIG. 1), an atmospheric pressure sensor 112 (FIG. 2), an outside air temperature sensor 114 (FIG. 2), and a monitoring electronic control unit 116 (FIG. 1 and FIG. 2). The leak check module 110 is hereinafter also referred to as "LCM 110" (LCM: leak check module). The monitoring electronic control unit 116 is also referred to as "monitoring ECU 116" or "ECU 116".

(A-1-5-2. LCM 110)

Figure 3:
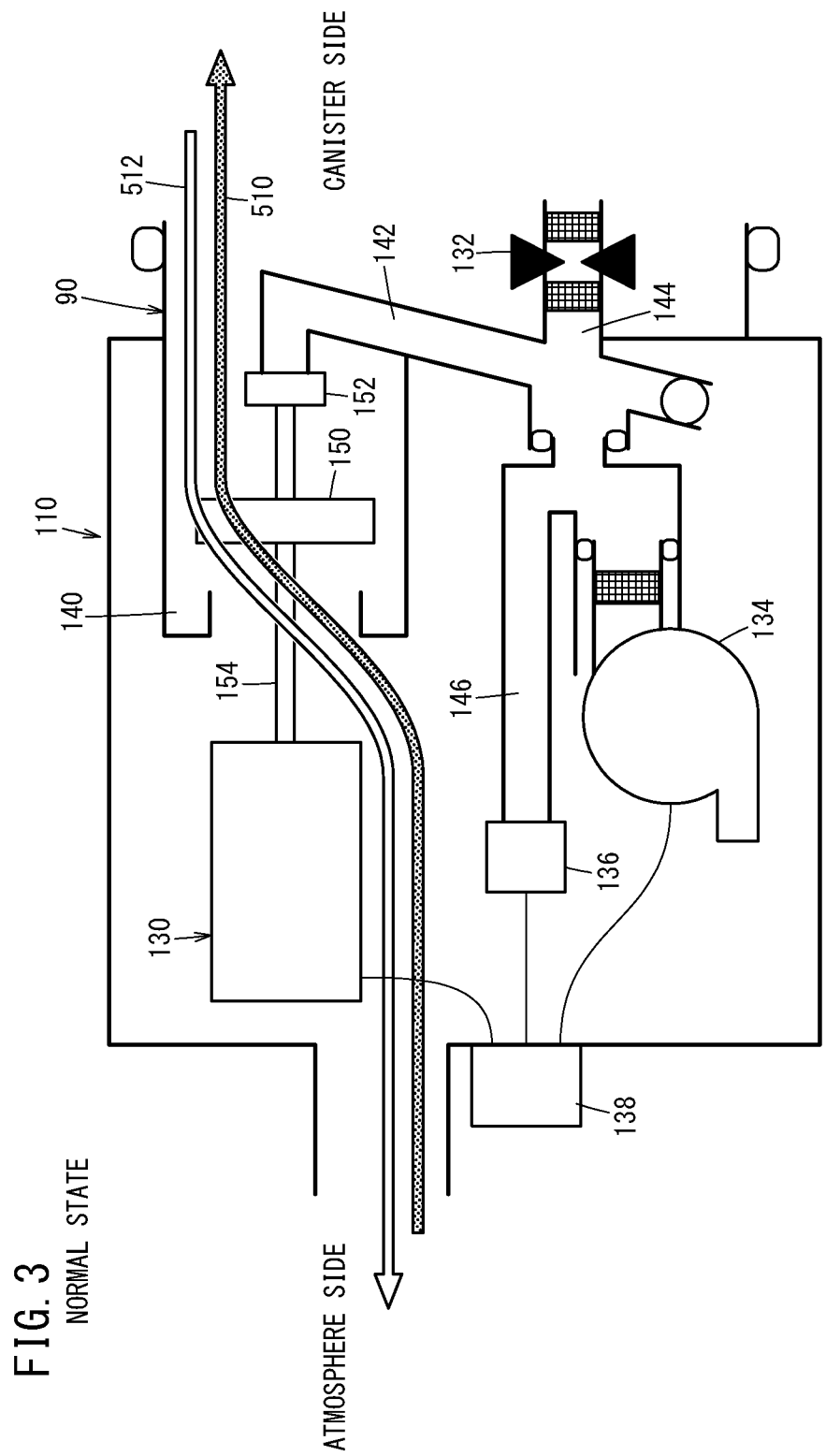
FIG. 3 illustrates an operation of a leak check module (LCM) and a flow of an internal fluid in a normal case in the embodiment.

FIG. 3 illustrates an operation of the LCM 110 and a flow of an internal fluid Fi in a normal case in the present embodiment. Here, the internal fluid Fi is a fluid including air and the gasified fuel 500. In FIG. 3, an arrow 510 indicates the flow of the internal fluid Fi at the time of purge, and an arrow 512 indicates the flow of the internal fluid Fi at the time of refueling.

Figure 4:
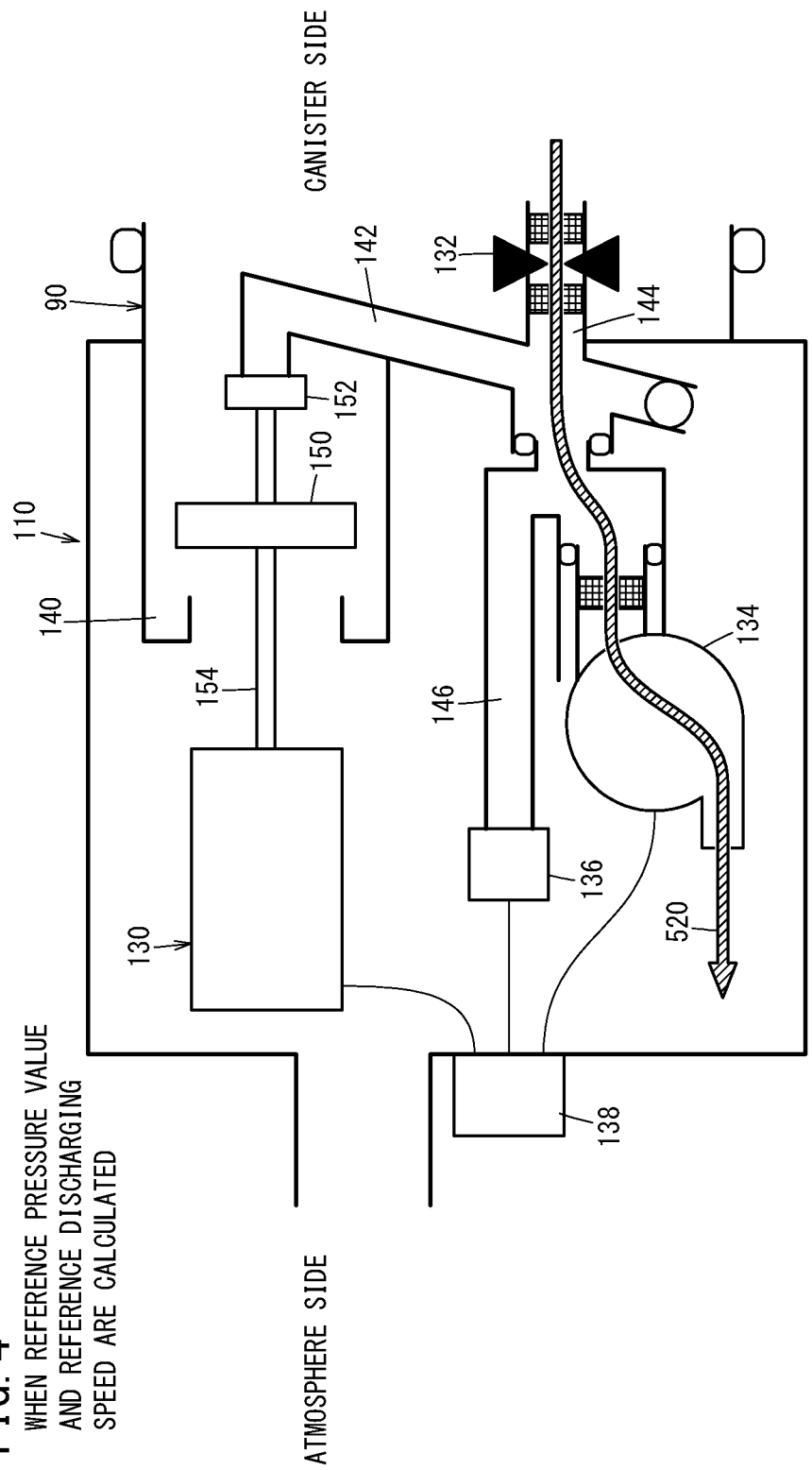
FIG. 4 illustrates a first example of the operation of the LCM and the flow of the internal fluid in diagnosing a fuel leak and in diagnosing a blockage in a vent line (in a case where reference pressure value and reference discharging speed are calculated) in the embodiment.

FIG. 4 illustrates a first example of the operation of the LCM 110 and the flow of the internal fluid Fi at the time of diagnosing the fuel leak and diagnosing the blockage in the vent line (in a case where a reference pressure value Pref and a reference discharging speed Qref are calculated) in the present embodiment. An arrow 520 in FIG. 4 indicates the flow of the internal fluid Fi in the first example described above.

Figure 5:
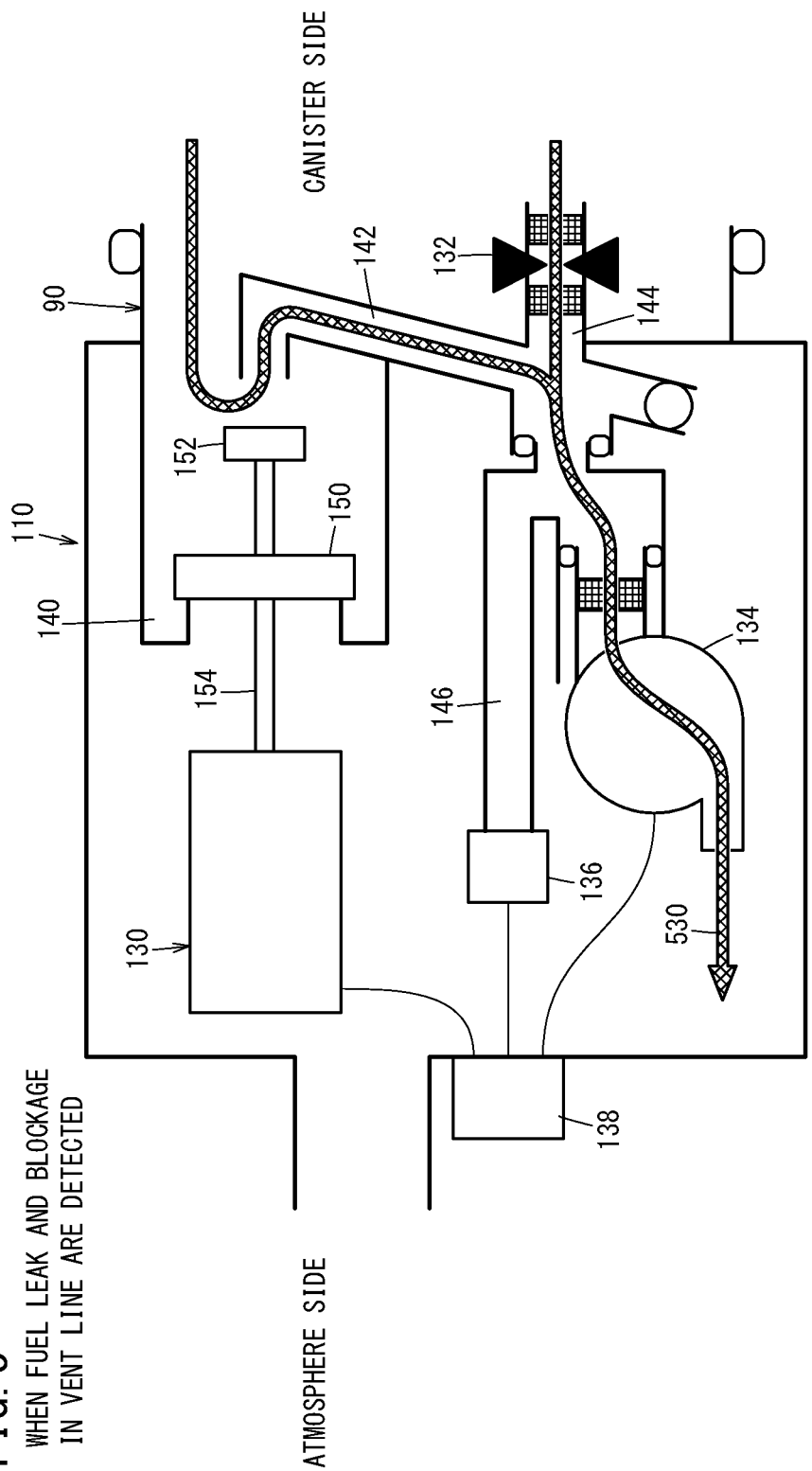
FIG. 5 illustrates a second example of the operation of the LCM and the flow of the internal fluid in diagnosing the fuel leak and in diagnosing the blockage in the vent line (in a case where fuel leak or blockage in the vent line is detected) in the embodiment.

FIG. 5 illustrates a second example of the operation of the LCM 110 and the flow of the internal fluid Fi at the time of diagnosing the fuel leak and diagnosing the blockage in the vent line (in a case where fuel leak or blockage in the vent line 90 is detected) in the present embodiment. An arrow 530 in FIG. 5 indicates the flow of the internal fluid Fi in the second example described above.

As illustrated in FIG. 3 to FIG. 5, the LCM 110 includes a switching valve 130, a reference orifice 132, a negative pressure pump 134, an internal pressure sensor 136, a connector 138, a main passage 140, a first bypass passage 142, a second bypass passage 144, and a third bypass passage 146.

The switching valve 130 (hereinafter, also referred to as "LCM switching valve 130" or "LCM solenoid valve 130") is a valve that switches the flow of the internal fluid Fi and is formed in the middle of the vent line 90. The switching valve 130 according to the present embodiment is a solenoid valve and includes a first blocking unit 150, a second blocking unit 152, and a support rod 154.

The first blocking unit 150 switches opening and blocking of the main passage 140 in the vent line 90. When the first blocking unit 150 is in an open state, the internal fluid Fi passes the LCM 110 through the main passage 140 as indicated by the arrows 510, 512 in FIG. 3. The internal fluid Fi that passes the vent line 90 in the LCM 110 mainly passes the main passage 140.

On the other hand, when the first blocking unit 150 is in a blocking state and the negative pressure pump 134 is in operation, the internal fluid Fi passes the LCM 110 through the first bypass passage 142 as indicated by the arrow 530 in FIG. 5. The first bypass passage 142 is a passage from a part blocked by the first blocking unit 150 to a confluence point of the first bypass passage 142 and the second bypass passage 144. The second bypass passage 144 is a passage from the orifice 132 to the negative pressure pump 134.

The second blocking unit 152 switches to open and block the first bypass passage 142. When the second blocking unit 152 is in a blocking state, the internal fluid Fi does not enter the first bypass passage 142 (first bypass passage 142 is blocked) as indicated by the arrows 510, 512 in FIG. 3. On the other hand, when the second blocking unit 152 is in an open state and the negative pressure pump 134 is in operation, the internal fluid Fi passes the LCM 110 through the first bypass passage 142 as indicated by the arrow 530 in FIG. 5.

The support rod 154 supports the first blocking unit 150 and the second blocking unit 152. Thus, in the present embodiment, if the first blocking unit 150 is in the open state, the second blocking unit 152 is in the blocking state, and if the first blocking unit 150 is in the blocking state, the second blocking unit 152 is in the open state, unless the support rod 154 is being displaced.

The reference orifice 132 (hereinafter, also referred to as "orifice 132") brings the vent line 90 (main passage 140) and the second bypass passage 144 into communication with each other.

The negative pressure pump 134 is a negative pressure source that generates negative pressure on the basis of the instruction from the monitoring ECU 116. For example, a vane pump can be used as the negative pressure pump 134. In the present embodiment, an intake port of the negative pressure pump 134 faces the second bypass passage 144. Thus, when the second blocking unit 152 is in the blocking state, the intake port of the negative pressure pump 134 is separated from the vent line 90 (main passage 140). An exhaust port of the negative pressure pump 134 is connected to the main passage 140. Thus, the internal fluid Fi that has passed the negative pressure pump 134 joins the main passage 140.

Note that the internal fluid Fi that has passed the negative pressure pump 134 may be discharged to an external environment without joining the main passage 140. In this case, other dust filter (second dust filter) than the dust filter 100 is disposed on an exhaust port side of the negative pressure pump 134.

The internal pressure sensor 136 (hereinafter, also referred to as "LCM negative pressure sensor 136") detects the negative pressure generated by the negative pressure pump 134. When the second blocking unit 152 is in the open state (FIG. 5), a detected value from the internal pressure sensor 136 expresses the internal pressure Pi of the internal space 300 (FIG. 8A) including the fuel tank 50, the vent line 90, and the purge line 96. In the present embodiment, the internal pressure sensor 136 is disposed on a tip of the third bypass passage 146 that is branched from the second bypass passage 144. Alternatively, the internal pressure sensor 136 may be disposed in the first bypass passage 142 or the second bypass passage 144. The connector 138 is used for connecting the switching valve 130, the negative pressure pump 134, and the internal pressure sensor 136 to the monitoring ECU 116.

Note that the basic configuration of the LCM 110 may employ a configuration in Japanese Laid-Open Patent Publication No. 2006-037752, for example.

(A-1-5-3. Atmospheric Pressure Sensor 112 and Outside Air Temperature Sensor 114)

The atmospheric pressure sensor 112 (FIG. 2) is disposed at a place that is hardly influenced by waste heat of the engine 20 (for example, place that is located away from the engine 20 in an engine room), and detects atmospheric pressure P0 [Pa]. The outside air temperature sensor 114 is disposed at a place that is hardly influenced by the waste heat of the engine 20 (for example, place that is located away from the engine 20 in the engine room), and detects outside air temperature T0 [° C.].

(A-1-5-4. Monitoring ECU 116)
(A-1-5-4-1. Outline of Monitoring ECU 116)

The monitoring ECU 116 determines whether the leak of the fuel 500 and the blockage in the vent line 90 has occurred. In other words, the ECU 116 performs fuel leak diagnosis control that diagnoses the leak of the fuel 500 and vent line blockage diagnosis control that diagnoses the blockage in the vent line 90. As illustrated in FIG. 2, the ECU 116 includes an input/output unit 160, a calculation unit 162, and a storage unit 164.

(A-1-5-4-2. Input/Output Unit 160)

The input/output unit 160 performs input/output of signals between the monitoring ECU 116 and other units (engine ECU 26 and the like).

(A-1-5-4-3. Calculation Unit 162)

The calculation unit 162 controls each unit of the vent line monitoring device 30 by executing programs stored in the storage unit 164, and includes a central processing unit (CPU), for example. As illustrated in FIG. 2, the calculation unit 162 includes a negative pressure controller 170, a leak determination unit 172, and a blockage determination unit 174.

The negative pressure controller 170 controls the negative pressure (internal pressure Pi) in the vent line 90 that is caused by the negative pressure pump 134 as the negative pressure source. The leak determination unit 172 determines whether the fuel leak in the fuel storage device 22 has occurred using the switching valve 130, the negative pressure pump 134, and the internal pressure sensor 136. The leak determination by the leak determination unit 172 may be the same as that in Japanese Laid-Open Patent Publication No. 2006-037752, for example.

The blockage determination unit 174 determines whether the blockage in the vent line 90 has occurred, and includes a discharging speed calculation unit 180, an elapsed time calculation unit 182, and a volume calculation unit 184. The discharging speed calculation unit 180 calculates the reference discharging speed Qref [L/sec] of the internal fluid Fi in the operation of the negative pressure pump 134. The elapsed time calculation unit 182 calculates elapsed time Δt [sec] for the internal pressure Pi of the vent line 90 to change from a second pressure value P2 (corresponding to initial pressure value Pini to be described below) to a first pressure value P1 (corresponding to reference pressure value Pref to be described below).

Figure 8A:
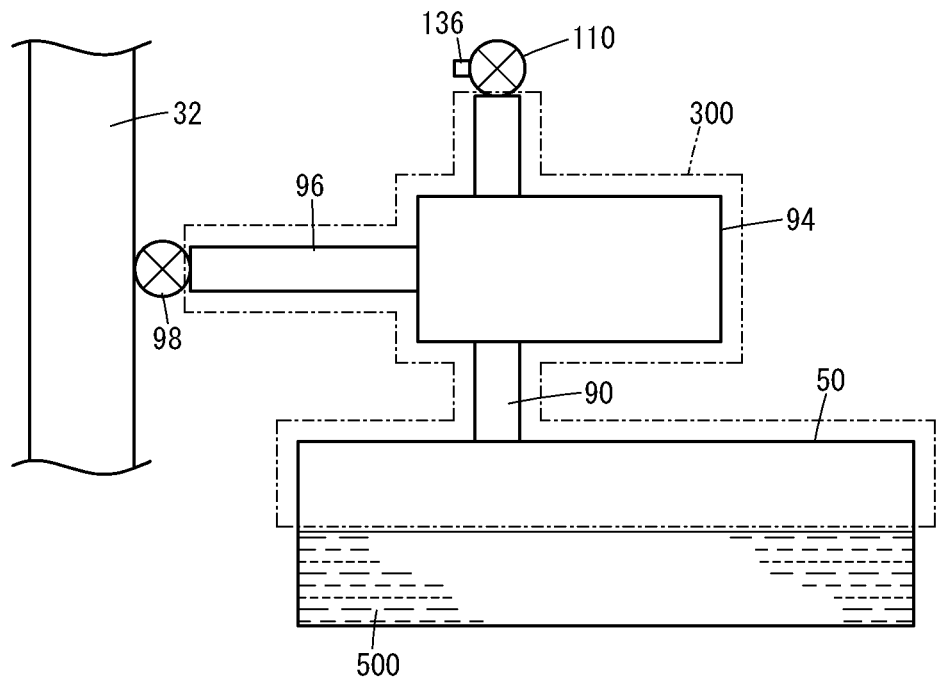
FIG. 8A illustrates one example of the volume of a device internal space in a normal state where the blockage in the vent line has not occurred in the embodiment.

The volume calculation unit 184 calculates the volume V [L] of the device internal space 300 (or the internal fluid Fi in the device internal space 300) on the basis of the reference discharging speed Qref and the elapsed time Δt. Here, the device internal space 300 (hereinafter, also referred to as "internal space 300") is a space including the fuel tank 50, the vent line 90, and the purge line 96 (FIG. 8A). When the purge valve 98 is closed, the device internal space 300 includes a space of a part of the purge line 96 that is more on the fuel tank 50 side than the purge valve 98, and does not include a space of another part of the purge line 96 that is more on the intake system 32 side than the purge valve 98. A process of the blockage determination unit 174 will be described below in detail with reference to FIG. 3 to FIG. 14.

(A-1-5-4-4. Storage Unit 164)

The storage unit 164 (FIG. 2) stores the programs and data to be used by the calculation unit 162. The storage unit 164 includes, for example, a random access memory (hereinafter, referred to as "RAM"). As the RAM, a volatile memory such as a register and a nonvolatile memory such as a flash memory can be used. The storage unit 164 may include, in addition to the RAM, a read only memory (hereinafter, referred to as "ROM") and/or a solid state drive (SSD).

Note that in the present embodiment, it is assumed that the programs and the data to be used by the calculation unit 162 are stored in the storage unit 164 of the vehicle 10. However, for example, a part of the programs and the data may be obtained from an external server (not shown) through a wireless device (not shown) included in the input/output unit 160. In addition, the monitoring ECU 116 may include a combination of a plurality of ECUs.

A-2. Control

[A-2-1. Fuel Leak Diagnosis Control]

The fuel leak diagnosis control is briefly described to help understanding of the vent line blockage diagnosis control to be described below. The fuel leak diagnosis control is control to diagnose whether the leak of the fuel 500 in the fuel tank 50 has occurred.

As described above, FIG. 3 illustrates the operation of the LCM 110 and the flow of the internal fluid Fi in the normal case of the present embodiment. FIG. 4 illustrates the first example of the operation of the LCM 110 and the flow of the internal fluid Fi at the time of diagnosing the fuel leak (in the case where reference pressure value Pref and reference discharging speed Qref are calculated) in the present embodiment. FIG. 5 illustrates the second example of the operation of the LCM 110 and the flow of the internal fluid Fi in diagnosing the fuel leak (in the case where fuel leak is detected) in the present embodiment.

Figure 6:
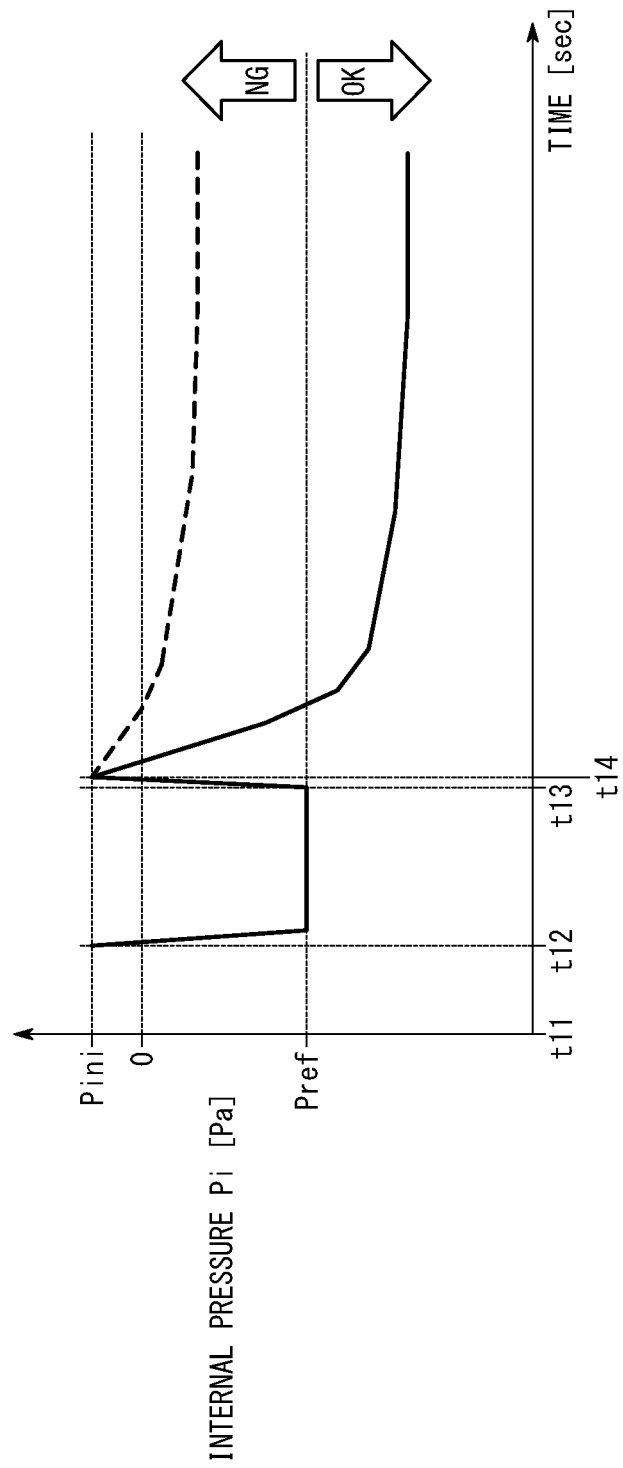
FIG. 6 is a time chart showing one example of a detected value from an internal pressure sensor (internal pressure) in fuel leak diagnosis control according to the embodiment.

FIG. 6 is a time chart showing one example of the detected value from the internal pressure sensor 136 (internal pressure Pi) in the fuel leak diagnosis control. The state between time points t11 and t12 in FIG. 6 is the normal state (FIG. 3). In the fuel leak diagnosis control, at the time point t12, the first bypass passage 142 is blocked by the second blocking unit 152 of the switching valve 130 and in this state, the operation of the negative pressure pump 134 is started (FIG. 4). In a state where output of the negative pressure pump 134 is constant, the internal pressure Pi decreases to the pressure Pref (hereinafter, also referred to as "reference pressure value Pref"). The ECU 116 stores the reference pressure value Pref.

Next, the LCM 110 is changed to a state shown in FIG. 5 by the ECU 116 (time point t13 in FIG. 6). That is to say, the ECU 116 opens the first bypass passage 142 using the switching valve 130, and moreover causes the negative pressure pump 134 to operate. In this state, the first bypass passage 142 communicates with the inside of the fuel tank 50. Therefore, the fluid in the fuel tank 50 flows into the first bypass passage 142 so that the internal pressure Pi temporarily returns to the initial pressure value Pini. After that, the pressure in the fuel tank 50 is gradually reduced by the operation of the negative pressure pump 134. Compared with the output (first output) of the negative pressure pump 134 in the state in FIG. 4, the output (second output) of the negative pressure pump 134 in the state in FIG. 5 is set to a larger value.

In the normal state where the leak from the fuel tank 50 has not occurred, the internal pressure Pi varies like a wave shape shown by a solid line (after t14) in FIG. 6, and decreases below the reference pressure value Pref. On the other hand, in a case where the fuel leak from the fuel tank 50 has occurred, the internal pressure Pi varies like a wave shape shown by a dashed line (after t14) in FIG. 6, and remains over the reference pressure value Pref. Therefore, the ECU 116 can determine whether the fuel leak from the fuel tank 50 has occurred by comparing the internal pressure Pi with the reference pressure value Pref.

A-2-2. Vent Line Blockage Diagnosis Control
(A-2-2-1. Detection Principle for Blockage in Vent Line 90)
(A-2-2-1-1. Outline of Detection Principle)

FIG. 7 is a diagram for describing an outline of the vent line blockage diagnosis control according to the present embodiment. In the vent line blockage diagnosis control (hereinafter, also referred to as "blockage diagnosis control") according the present embodiment, the blockage in the vent line 90 is detected. In FIG. 7, a cross mark shown on the vent line 90 indicates a state where the vent line 90 is blocked. Before specific description of the vent line blockage diagnosis control, a detection principle for the blockage in the vent line 90 is described.

Figure 8B:
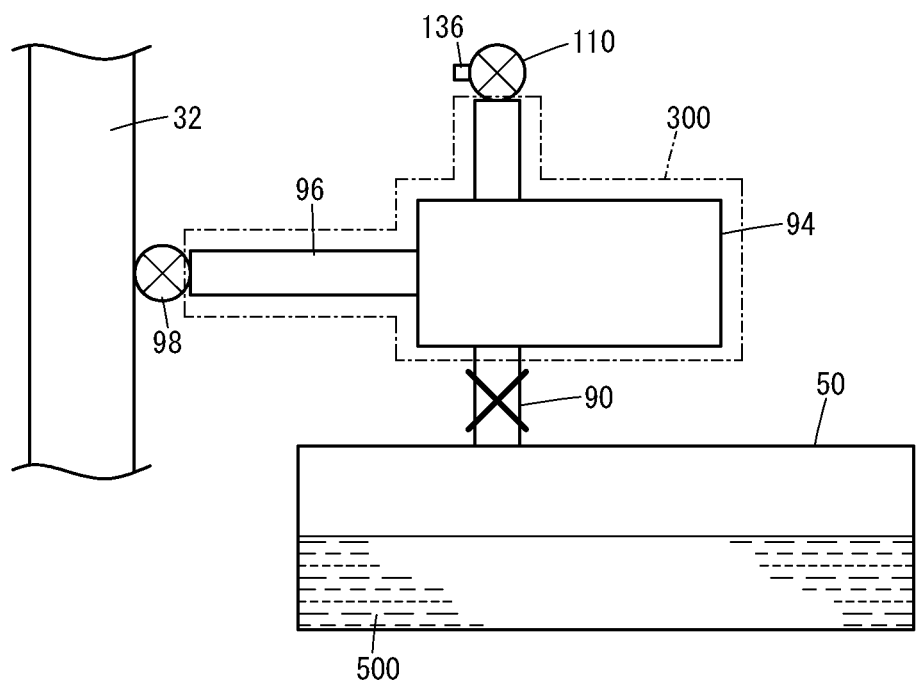
FIG. 8B illustrates one example of the volume of the device internal space in a blocked state where the vent line is blocked in the embodiment.

FIG. 8A illustrates one example of the volume V of the device internal space 300 in a normal state where the blockage in the vent line 90 has not occurred in the present embodiment. FIG. 8B illustrates one example of the volume V of the device internal space 300 in a blocked state where the vent line 90 is blocked in the present embodiment. Here, the volume V of the device internal space 300 (hereinafter, also referred to as "internal space volume V") is the volume of a space including the fuel tank 50, the vent line 90, and the purge line 96. The amount of the fuel 500 in the fuel tank 50 varies. Thus, the internal space volume V in the normal state varies depending on the amount of the fuel 500. The internal space volume V in the normal state is the minimum when the fuel tank 50 is fully filled, and is the maximum when the fuel tank 50 is empty (out of the fuel 500).

As described above, in the vent line blockage diagnosis control, it is determined whether the blockage in the vent line 90 has occurred. In a case the negative pressure pump 134 is operated at a constant output, the volume to which the negative pressure is applied when the vent line 90 is blocked (FIG. 8B) is smaller than that when the vent line 90 is not blocked (FIG. 8A). Therefore, the pressure is reduced faster when the vent line 90 is blocked. In other words, even the minimum internal space volume V in the normal state (in the case where the fuel tank 50 is fully filled) is larger than the internal space volume V in the blocked state of the vent line 90.

In view of this, in the present embodiment, the internal space volume V is estimated by using, for example, the internal pressure Pi detected by the internal pressure sensor 136 of the LCM 110. Then, if the estimated internal space volume V is smaller than a value that can be obtained in the normal state, it is determined that the vent line 90 is blocked. To be described below, in the present embodiment, it is determined whether the vent line 90 is blocked by comparing the volume V with a volume threshold THv.

(A-2-2-1-2. Calculation Method for Internal Space Volume V)
(A-2-2-1-2-1. Outline)

As described above, in the present embodiment, the internal space volume V is calculated on the basis of the internal pressure Pi detected by the internal pressure sensor 136 of the LCM 110, for example. Then, the blockage in the vent line 90 is determined depending on whether the internal space volume V is a value that can be obtained in the normal state.

The internal space volume V is calculated using the following Expression (1) that is based on a gas state equation.

[Expression 1]

$$V = \frac{P0}{P1 - P2} \times Qref \times \Delta t \quad (1)$$

Definitions of values in Expression (1) are as follows.
P0: atmospheric pressure [Pa]
P1: first pressure value [Pa]

P2: second pressure value [Pa]

Qref: reference discharging speed [L/sec]

Δt: elapsed time from time point when internal pressure Pi is second pressure value P2 [sec]

The first pressure value P1 is the internal pressure Pi (initial pressure value Pini) detected by the internal pressure sensor 136 of the LCM 110 in a state open to the atmosphere. The second pressure value P2 is the lowest value of the internal pressure Pi that can be obtained in the state in FIG. 5 (in the present embodiment, the lowest value is equal to the reference pressure value Pref).

(A-2-2-1-2-2. Reference Discharging Speed Qref)

(A-2-2-1-2-2-1. Outline of Reference Discharging Speed Qref)

As illustrated in FIG. 4, when the reference discharging speed Qref of the vent line 90 is calculated, the first bypass passage 142 is blocked by the second blocking unit 152 of the switching valve 130 and the operation of the negative pressure pump 134 is started. Thus, as indicated by the arrow 520, the outside air is sucked into the LCM 110 (second bypass passage 144) through the orifice 132 by the negative pressure (internal pressure Pi) generated by the negative pressure pump 134.

Since the first bypass passage 142 is blocked by the switching valve 130, the internal fluid Fi is not sucked through the main passage 140. In other words, the vent line 90 is separated from the intake port of the negative pressure pump 134 by the switching valve 130. Therefore, the detected value from the internal pressure sensor 136 (internal pressure Pi) expresses the pressure Pref of the internal fluid Fi when the internal fluid Fi is sucked.

A diameter d of a hole of the orifice 132 is known. Thus, the reference discharging speed Qref can be calculated by using the following Expression (2).

[Expression 2]

$$Qref = \frac{\pi d^2}{4} \times A \frac{\sqrt{2\Delta P}}{\rho} \quad (2)$$

Definitions of values in Expression (2) are as follows.

π: circumference ratio d: diameter of orifice 132 [m]

A: flow rate coefficient

ΔP: pressure difference [Pa]

ρ: air density [g/m$^3$]

The flow rate coefficient A is a coefficient to correct a theoretical flow rate into an actual flow rate. To be described below, the flow rate coefficient A can vary depending on the internal pressure Pi. The pressure difference ΔP is a difference between the atmospheric pressure P0 and the internal pressure Pi (=P0−Pi). The air density ρ is calculated by using the following Expression (3).

[Expression 3]

$$\rho = \frac{P0}{R \times (T0 + 273.15)} \quad (3)$$

Definitions of values in Expression (3) are as follows.

P0: atmospheric pressure [Pa]

R: gas constant of dry air (=2.87)

T0: outside air temperature [° C.]

273.15: value to convert Celsius to Kelvin

As described above, by using Expression (2) and Expression (3), the reference discharging speed Qref of the vent line 90 can be calculated.

(A-2-2-1-2-2-2. Flow Rate Coefficient A)

Figure 9:
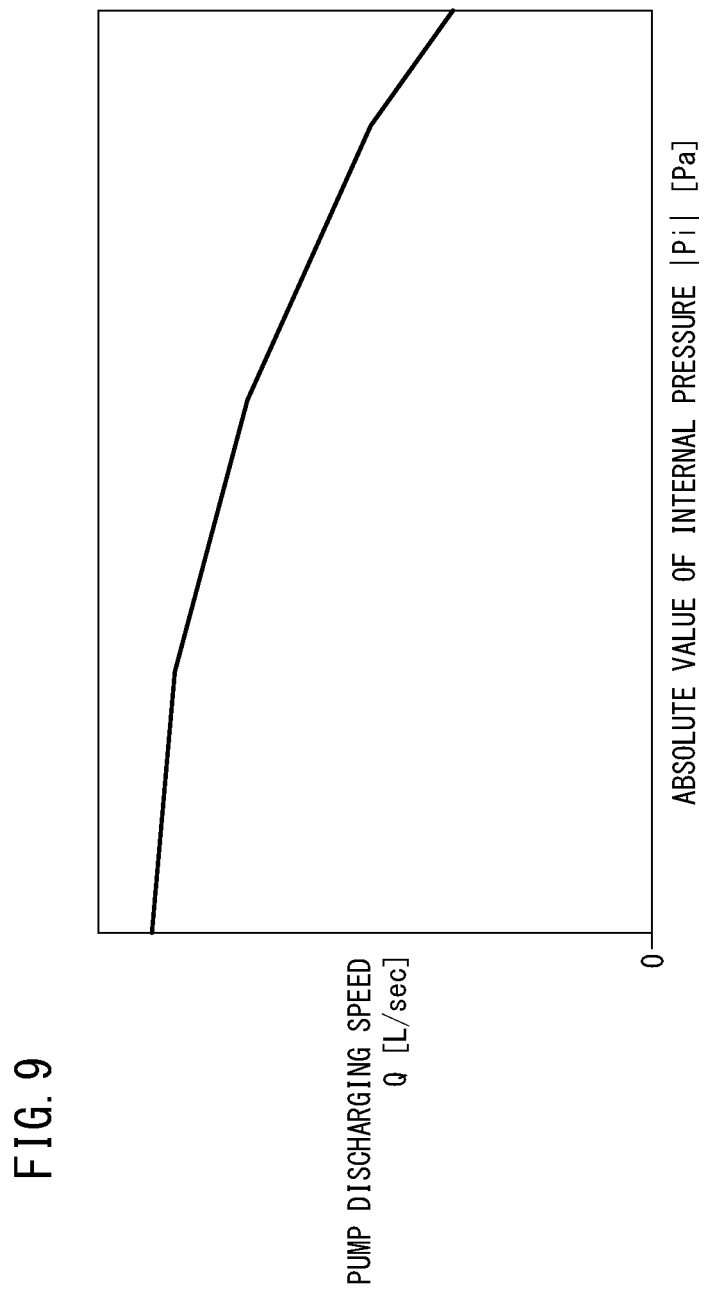
FIG. 9 illustrates one example of a relation between an absolute value of the pressure in the device internal space (internal pressure) and discharging speed of a negative pressure pump in the vent line blockage diagnosis control according to the embodiment.

FIG. 9 illustrates one example of a relation between an absolute value of the pressure in the device internal space 300 (internal pressure Pi) and the discharging speed Q of the negative pressure pump 134 in the vent line blockage diagnosis control according to the present embodiment. As illustrated in FIG. 9, as the absolute value of the internal pressure Pi that is the negative pressure becomes large, the discharging speed Q (pump discharging speed Q) by the negative pressure pump 134 tends to decrease. Thus, the ECU 116 can vary the flow rate coefficient A in Expression (2) depending on the internal pressure Pi.

Specifically, a person in charge stores the relation between the internal pressure Pi and the flow rate coefficient A in the storage unit 164 in advance. Then, the ECU 116 reads out the flow rate coefficient A in accordance with the internal pressure Pi from the storage unit 164 and substitutes the flow rate coefficient A into Expression (1).

Note that the flow rate coefficient A may be a fixed value.

(A-2-2-1-3. Detection Timing)

Figure 10A:
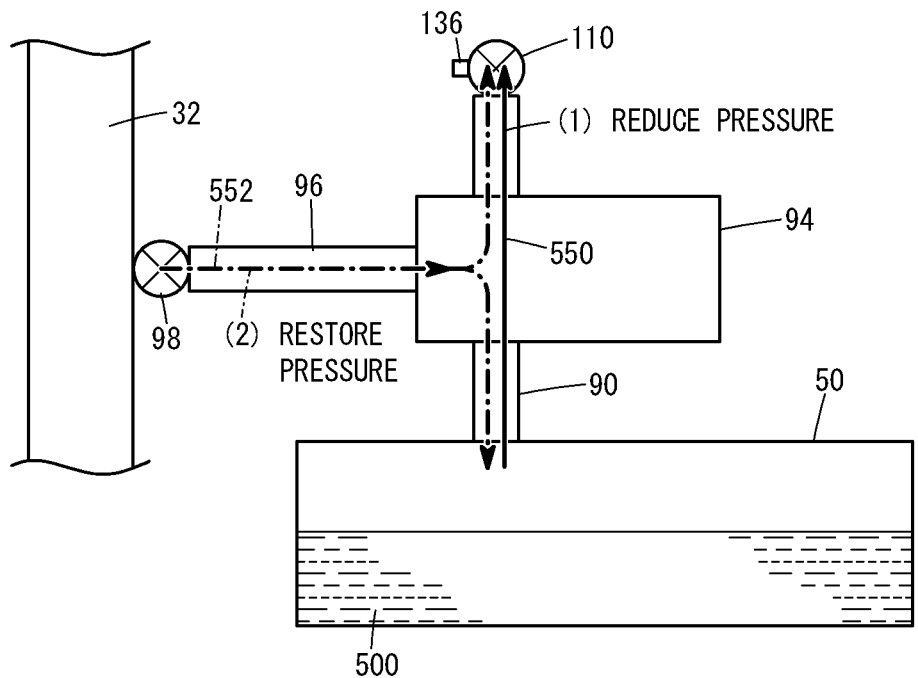
FIG. 10A is a schematic diagram illustrating the flow of the internal fluid when the vent line blockage diagnosis control according to the embodiment is performed.
Figure 10B:
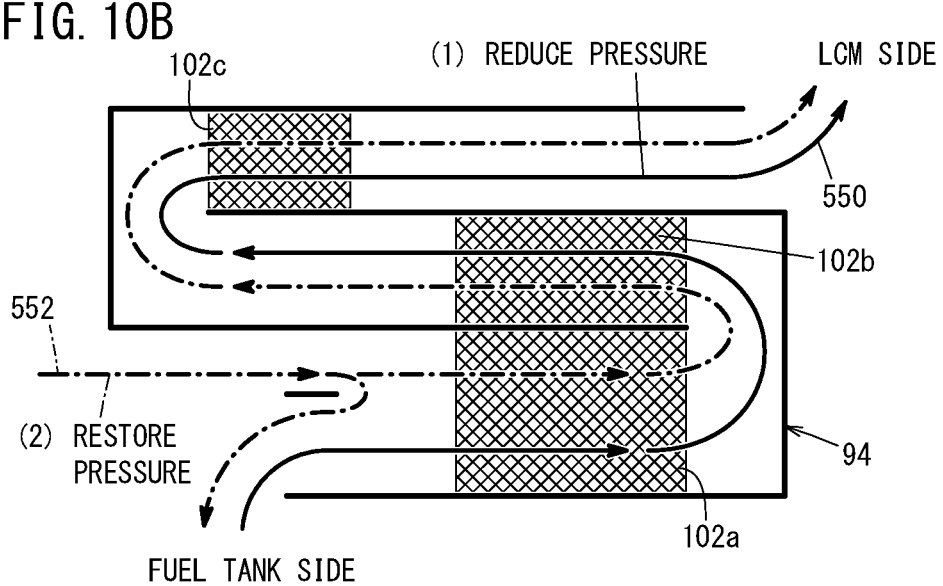
FIG. 10B is a schematic diagram illustrating the flow of the internal fluid in the canister and its peripheral part in accordance with the case in FIG. 10A.

FIG. 10A is a schematic diagram illustrating the flow of the internal fluid Fi when the vent line blockage diagnosis control according to the present embodiment is performed. FIG. 10B is a schematic diagram illustrating the flow of the internal fluid Fi in the canister 94 and its inner peripheral part in accordance with the case in FIG. 10A. In FIG. 10A and FIG. 10B, a flow indicated by a first arrow 550 is the flow of the internal fluid Fi when the LCM 110 is reducing the pressure (pressure reduced state) with the purge valve 98 closed. A flow indicated by a second arrow 552 is the flow of the internal fluid Fi when, after the pressure is reduced, the purge valve 98 is opened so that the pressure in the device internal space 300 is being restored (pressure restored state).

The present inventor has discovered that, if the internal space volume V is calculated in the pressure reduced state, the internal space volume V includes an error. Examinations by the present inventor have suggested that the error is caused by the influence of a pressure loss of the canister 94, the amount of evaporated fuel adsorbed by the canister 94, and the like.

Then, in the present embodiment, the blockage in the vent line 90 is determined by using the internal space volume V not in the pressure reduced state but in the pressure restored state after the pressure reduced state. Note that even in the pressure restored state, it is assumed that there is an influence of the amount of evaporated fuel and the like. However, as a result of the examinations by the present inventor, the error of the blockage determination in the pressure restored state is smaller than that in the pressure reduced state.

(A-2-2-1-4. Specific Procedure)

(A-2-2-1-4-1. Overall Procedure of Vent Line Blockage Diagnosis Control)

Figure 11:
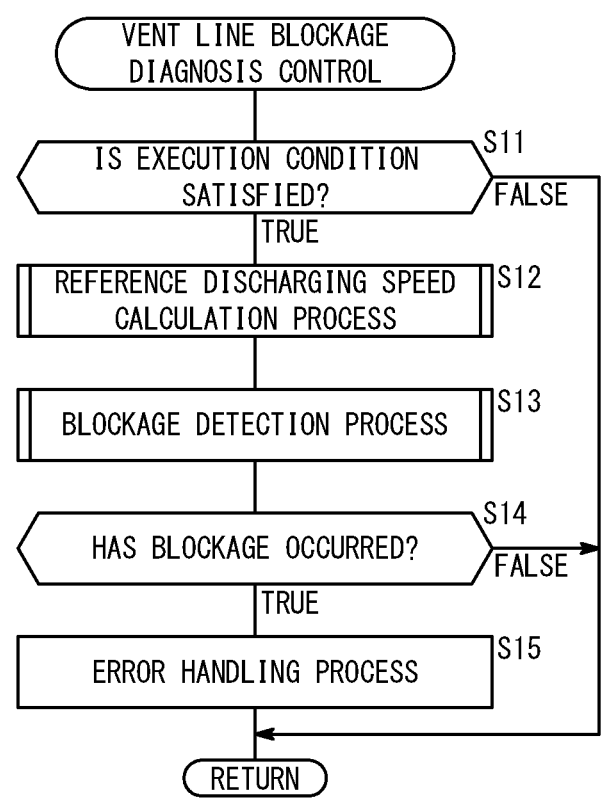
FIG. 11 is a flowchart of the vent line blockage diagnosis control in the embodiment.
Figure 12:
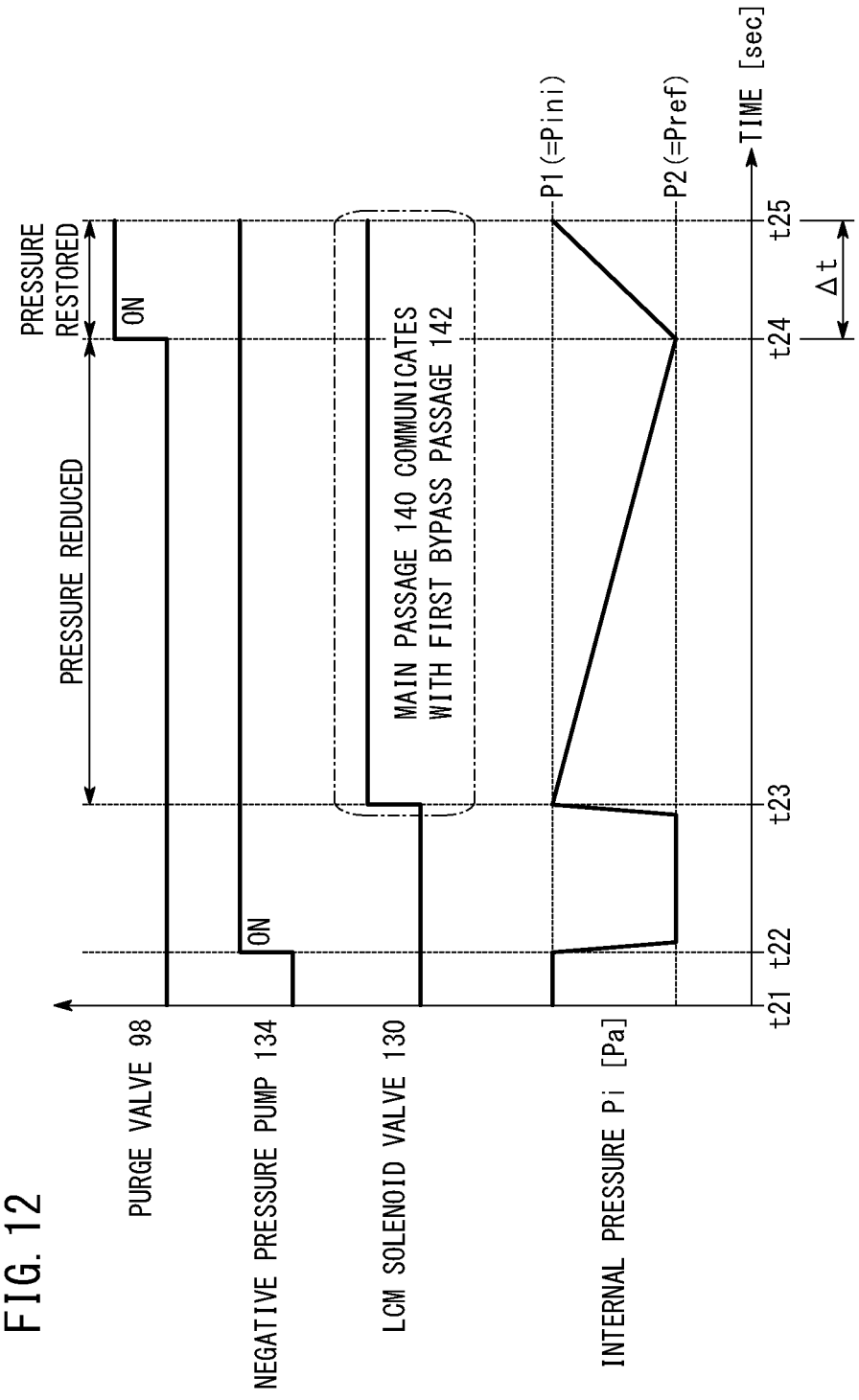
FIG. 12 is a time chart showing an example of various values when the vent line blockage diagnosis control according to the embodiment is performed.

FIG. 11 is a flowchart of the vent line blockage diagnosis control in the present embodiment. FIG. 12 is a time chart showing an example of various values when the vent line blockage diagnosis control according to the present embodiment is performed. That is to say, FIG. 12 shows on/off (or open/close) of the purge valve 98 (FIG. 1), on/off of the negative pressure pump 134 (FIG. 2), a state of the LCM solenoid valve 130 (FIG. 2), and the internal pressure Pi. In regard to the state of the LCM solenoid valve 130, a low side in FIG. 12 corresponds to the state in FIG. 3 and FIG. 4 (where the main passage 140 does not communicate with the first bypass passage 142), and a high side in FIG. 12 corresponds to the state in FIG. 5 (where the main passage 140 communicates with the first bypass passage 142).

The blockage determination unit 174 and the negative pressure controller 170 of the monitoring ECU 116 execute steps S11 to S15 in FIG. 11. In step S11, the monitoring ECU 116 determines whether an execution condition of a reference discharging speed calculation process (S12) and a blockage detection process (S13) is satisfied. Here, the execution condition is that the engine 20 has stopped, for example. The stop of the engine 20 herein described can be determined, for example, when a predetermined time (for example, any value from several minutes to several hours) has passed after the IGSW 24 is turned off. Further, the stop of the engine 20 can include an idle stop. When the execution condition is satisfied, the ECU 116 closes the purge valve 98 (FIG. 1). Therefore, the fuel tank 50 does not communicate with the intake system 32. If the execution condition is satisfied (S11: TRUE), the process advances to step S12. If the execution condition is not satisfied (S11: FALSE), this process ends and, after a predetermined period has passed, step S11 is executed again.

In step S12, the ECU 116 executes the reference discharging speed calculation process (time points t22 to t23 in FIG. 12). The reference discharging speed calculation process is a process for calculating the reference discharging speed Qref to determine whether the blockage in the vent line 90 has occurred. The ECU 116 calculates the reference discharging speed Qref using the LCM 110. The reference discharging speed calculation process will be described in detail with reference to FIG. 13, etc.

In step S13, the ECU 116 executes the blockage detection process (time points t23 to t25 in FIG. 12). The blockage detection process is a process for detecting the blockage in the vent line 90 using the reference discharging speed Qref calculated in step S12. The ECU 116 executes the blockage detection process using the LCM 110. The blockage detection process will be described in detail with reference to FIG. 14, etc.

If the ECU 116 determines that the blockage has occurred as a result of the blockage detection process (S14: TRUE), the ECU 116 executes an error handling process regarding the blockage in step S15. For example, the ECU 116 displays a warning message in the display unit 28. In addition, the ECU 116 may store a failure code in the storage unit 164. If it is determined that the blockage has not occurred (S14: FALSE), this process ends, and after a predetermined period has passed, step S11 is executed again.

(A-2-2-1-4-2. Reference Discharging Speed Calculation Process)

Figure 13:
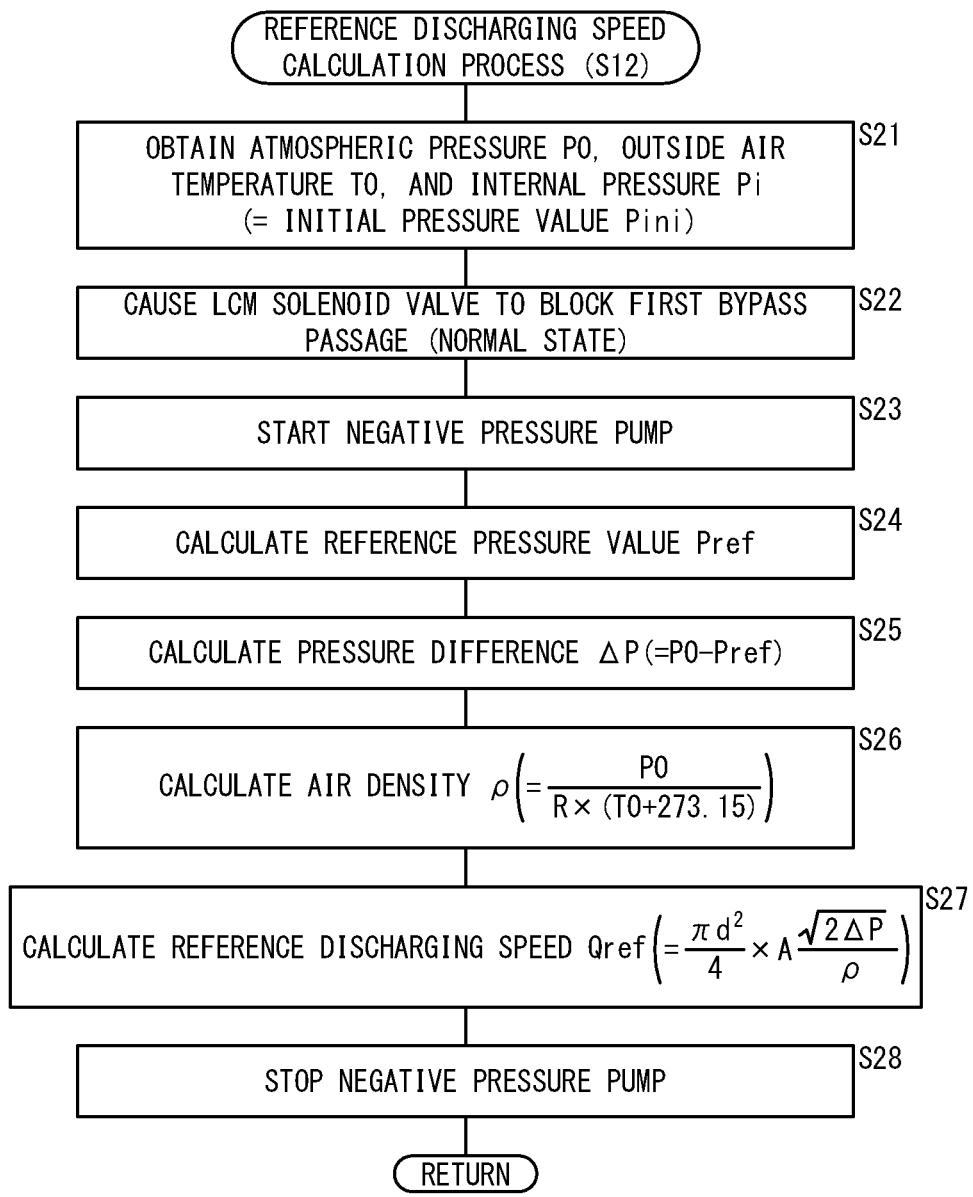
FIG. 13 is a flowchart of a reference discharging speed calculation process in the embodiment (details of S12 in FIG. 11)

FIG. 13 is a flowchart of the reference discharging speed calculation process in the present embodiment (details of S12 in FIG. 11). In step S21, the ECU 116 obtains the atmospheric pressure P0 from the atmospheric pressure sensor 112, the outside air temperature T0 from the outside air temperature sensor 114, and the internal pressure Pi from the internal pressure sensor 136. Note that the internal pressure Pi is obtained as a value in time points t21 to t22 in FIG. 12. Here, the internal pressure Pi is used as the initial pressure value Pini in the blockage detection process (S13 in FIG. 11, FIG. 14).

In step S22, the ECU 116 causes the second blocking unit 152 of the LCM solenoid valve 130 to block the first bypass passage 142 (FIG. 4). Note that as described above, the first bypass passage 142 is blocked similarly to the normal state (FIG. 3).

In step S23, the blockage determination unit 174 of the ECU 116 causes the negative pressure pump 134 to operate through the negative pressure controller 170 (FIG. 4). In the present embodiment, operation control of the negative pressure pump 134 includes only two patterns, that is, on/off. The on state (output) of the negative pressure pump 134 is not divided into multiple stages. Alternatively, the on state (output) of the negative pressure pump 134 may be divided into multiple stages.

In step S24, the ECU 116 obtains the internal pressure Pi from the internal pressure sensor 136, and calculates the reference pressure value Pref (time points t22 to t23 in FIG. 12). Specifically, after the operation of the negative pressure pump 134 is started, the ECU 116 obtains the detected values (internal pressure Pi) from the internal pressure sensor 136 at predetermined intervals. Then, a value, when a variation value ΔPi of the internal pressure Pi per unit time has become less than or equal to a variation threshold THΔPi, is set as the reference pressure value Pref. Alternatively, a value when a predetermined time has passed after the operation start of the negative pressure pump 134 may be the reference pressure value Pref.

Note that the reference pressure value Pref in the time points t12 to t13 in FIG. 6 and the reference pressure value Pref in the time points t22 to t23 in FIG. 12 are obtained by a similar method. In step S25 in FIG. 13, the ECU 116 calculates the pressure difference ΔP between the atmospheric pressure P0 and the reference pressure value Pref (ΔP=P0−Pref).

In step S26, the ECU 116 calculates the air density ρ using the atmospheric pressure P0 and the outside air temperature T0 (see above Expression (3)). In step S27, the ECU 116 calculates the reference discharging speed Qref using the pressure difference ΔP, the air density ρ, and the like (see above Expression (2)). As described above, the flow rate coefficient A in Expression (2) may be a variable depending on the internal pressure Pi (=reference pressure value Pref). In step S28, the ECU 116 stops the negative pressure pump 134.

(A-2-2-1-4-3. Blockage Detection Process)

Figure 14:
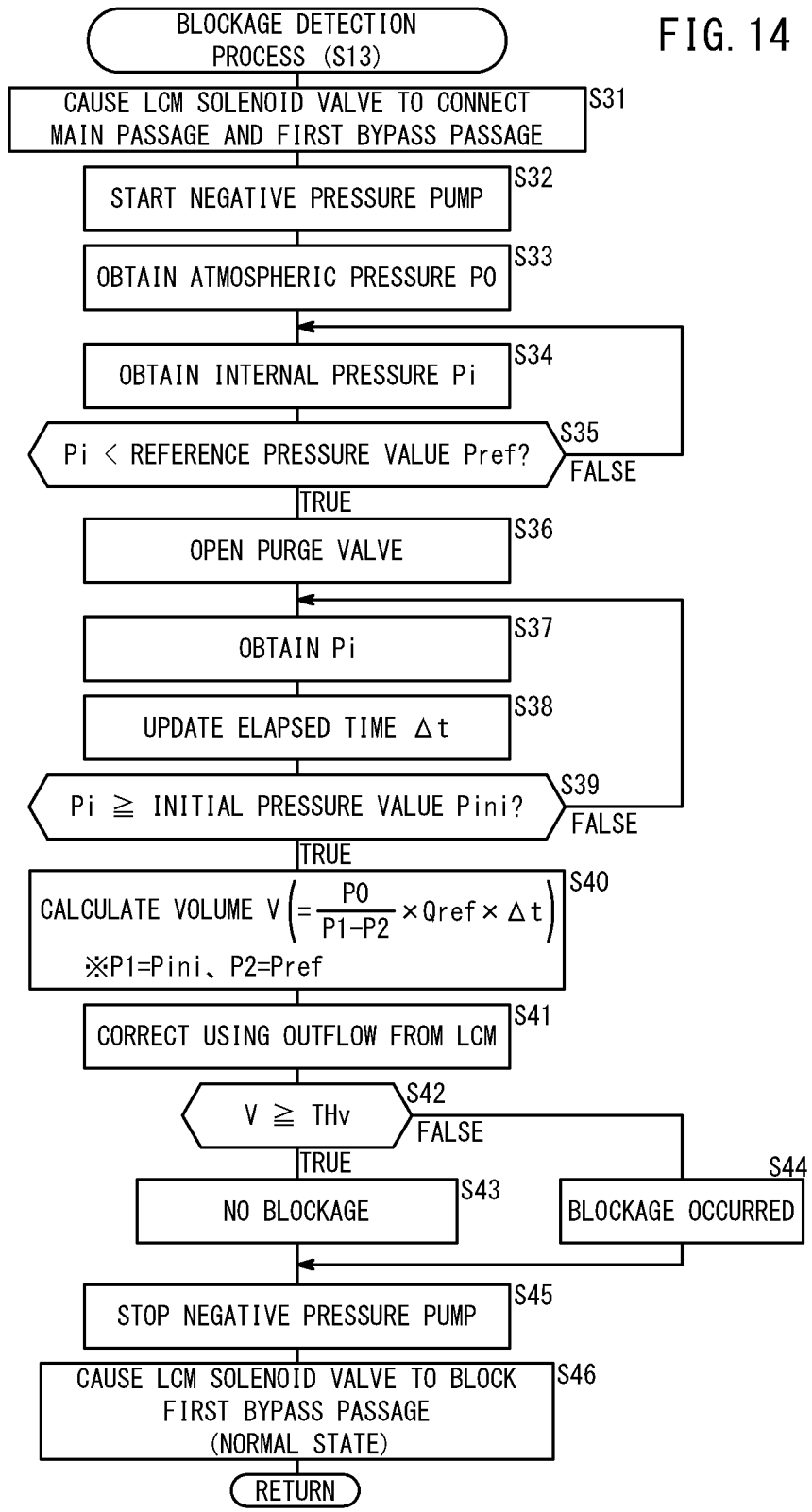
FIG. 14 is a flowchart of a blockage detection process in the embodiment (details of S13 in FIG. 11).

FIG. 14 is a flowchart of the blockage detection process in the present embodiment (details of S13 in FIG. 11). In step S31, the ECU 116 causes the first blocking unit 150 of the LCM solenoid valve 130 to block the main passage 140 in the middle, and on the other hand, causes the second blocking unit 152 to connect the main passage 140 and the first bypass passage 142 (FIG. 5) to communicate with each other. Then, the internal fluid Fi in the fuel tank 50 flows into the first bypass passage 142 so that the internal pressure Pi temporarily returns to the initial pressure value Pini.

In step S32, the ECU 116 causes the negative pressure pump 134 to reduce the pressure in the fuel tank 50 (time point t23 in FIG. 12). As described above, in the present embodiment, the operation control of the negative pressure pump 134 includes only two patterns, that is, on/off. Note that the output of the negative pressure pump 134 in the blockage detection process is larger than that in the reference discharging speed calculation process (S12 in FIG. 11) (see FIG. 6). In step S33, the ECU 116 obtains the atmospheric pressure P0 from the atmospheric pressure sensor 112.

In step S34, the ECU 116 obtains (or updates) the internal pressure Pi. In step S35, the ECU 116 determines whether the internal pressure Pi is less than the reference pressure value Pref. This reference pressure value Pref is a value that is calculated in the reference discharging speed calculation process (S12 in FIG. 11, FIG. 13). An object of step S35 is to check whether the internal pressure Pi is sufficiently reduced to determine whether the blockage in the vent line 90 has occurred. Thus, a first pressure threshold to be compared with the internal pressure Pi may be a value other than the reference pressure value Pref. If the internal pressure Pi is less than the reference pressure value Pref (S35: TRUE), the process advances to step S36. If the internal pressure Pi is not less than the reference pressure value Pref (S35: FALSE), the process returns to step S34.

In step S36, the ECU 116 opens the purge valve 98 (time point t24 in FIG. 12). Thus, the state between the inside of the fuel tank 50 and the intake system 32 is changed from a non-communicating state to a communicating state. At that time point, by the operation of the negative pressure pump 134, the inside of the fuel tank 50 and the vent line 90 are in the pressure reduced state. On the other hand, since the engine 20 is stopped, the pressure inside the intake system 32 is equal to or near the atmospheric pressure P0. Therefore, the fluid in the intake system 32 flows into the fuel tank 50 through the purge line 96 and the vent line 90, and moreover, is discharged to the outside through the canister 94 and the LCM 110.

In step S37, the ECU 116 obtains (or updates) the internal pressure Pi. In step S38, the ECU 116 updates the elapsed time Δt from starting to calculate the volume V. For example, the elapsed time Δt is increased by a predetermined value every time step S38 is repeated.

In step S39, the ECU 116 determines whether the internal pressure Pi has become more than or equal to the initial pressure value Pini. This initial pressure value Pini is a value that is obtained in the reference discharging speed calculation process (S12 in FIG. 11, S21 in FIG. 13). An object of step S39 is to check whether the internal pressure Pi is sufficiently increased to determine whether the blockage in the vent line 90 has occurred. Thus, a second pressure threshold to be compared with the internal pressure Pi may be a value other than the initial pressure value Pini. If the internal pressure Pi is more than or equal to the initial pressure value Pini (S39: TRUE), the process advances to step S40. If the internal pressure Pi is not more than or equal to the initial pressure value Pini (S39: FALSE), the process returns to step S37.

In step S40, the ECU 116 calculates the internal space volume V on the basis of the reference discharging speed Qref, the elapsed time Δt, the atmospheric pressure P0, and the reference pressure value Pref (see above Expression (1)). The internal space volume V calculated in step S40 is a value that is calculated in the state where the negative pressure pump 134 is in operation. Thus, the internal space volume V calculated in step S40 also includes the volume of the internal fluid Fi that has passed the negative pressure pump 134 of the LCM 110.

Thus, in step S41, the ECU 116 executes a correction in which the volume of the internal fluid Fi that outflows from the LCM 110 is subtracted from the internal space volume V calculated in step S40. For example, the outflow from the LCM 110 is calculated based on a function using the reference discharging speed Qref and the elapsed time Δt.

In step S42, the ECU 116 determines whether the volume V corrected in step S41 is more than or equal to the volume threshold THv. The volume threshold THv is a threshold to determine whether the blockage in the vent line 90 has occurred. That is to say, a specification of the fuel storage device 22 is specified in a design phase. A theoretical value of the volume V can be calculated by using the specification of the fuel storage device 22. Alternatively, the range of the volume V can be determined in advance by a simulation value or an actual measurement value. Then, in the present embodiment, the volume threshold THv is set based on the volume V (flow rate) that is calculated or obtained in advance as described above. Instead of the theoretical value, the simulation value, or the actual measurement value, the volume threshold THv may be a value that is obtained by adding an allowance to any of these values in consideration of the error.

If the volume V is more than or equal to the volume threshold THv (S42: TRUE), in step S43, the ECU 116 determines that the blockage in the vent line 90 has not occurred. If the volume V is not more than or equal to the volume threshold THv (S42: FALSE), in step S44, the ECU 116 determines that the blockage in the vent line 90 has occurred.

After step S43 or S44, the ECU 116 stops the negative pressure pump 134 in step S45. In step S46, the ECU 116 releases the first blocking unit 150 of the LCM solenoid valve 130 from blocking of the main passage 140, and on the other hand, causes the second blocking unit 152 to block the first bypass passage 142 (FIG. 3). Thus, the vent line 90 becomes the normal state (FIG. 3).

A-3. Effect of the Present Embodiment

As described above, in the present embodiment, the purge valve 98 is opened in the state where the pressure in the device internal space 300 is reduced by the negative pressure pump 134 (t24 in FIG. 12, S36 in FIG. 14). Then, the blockage in the vent line 90 is detected using the volume V (gas information) of the device internal space 300 that is calculated based on the internal pressure Pi before and after the purge valve 98 is opened (t24 to t25 in FIGS. 12, S42 to S44 in FIG. 14). Thus, the blockage in the vent line 90 can be detected using the volume V that is based on the internal pressure Pi that is restored. Note that by using the internal pressure when restored, it is relatively easy to distinguish whether the blockage in the vent line 90 has occurred. Therefore, the blockage in the vent line 90 can be detected with high accuracy.

In the pressure restored state, it is relatively easy to distinguish whether the blockage in the vent line 90 has occurred. Therefore, it can be detected whether the blockage in the vent line 90 has occurred even when the pressure in the device internal space 300 is reduced relatively weakly. Thus, when it is detected whether the blockage in the vent line 90 has occurred at the pressure that is reduced relatively weakly, the durability of the fuel storage device 22 (or vent line 90, for example) can be enhanced.

In addition, the negative pressure pump 134 is operated (t22 to t25 in FIG. 12, S23 in FIG. 13, S32 in FIG. 14) before and after the purge valve 98 is opened (t24 in FIG. 12) in the state where the pressure in the device internal space 300 is reduced. Thus, the negative pressure pump 134 can be operated even after the purge valve 98 is opened. Therefore, the fluid that flows from the intake system 32 or the outside to the device internal space 300 due to the opening of the purge valve 98 has less influence on the negative pressure pump 134.

In the present embodiment, by the monitoring device 30 (blockage detection device), the volume V (gas information) reflects the influence of the operation of the negative pressure pump 134 after the purge valve 98 is opened (S41). Furthermore, the monitoring device 30 (blockage detection device) detects the blockage in the vent line 90 using the volume V that reflects the above influence (S42 to S44). Thus, even when the negative pressure pump 134 is operated after the purge valve 98 is opened, the blockage in the vent line 90 can be detected with high accuracy.

In the present embodiment, while the engine 20 is stopped (S11 in FIG. 11: TRUE), the monitoring device 30 (blockage detection device) detects the blockage in the vent line 90 (S13 in FIG. 11). Thus, when the pressure in the intake system 32 of the engine 20 is positive and the pressure in the fuel storage device 22 is negative (reduced pressure), the blockage in the vent line 90 can be detected. Therefore, in the pressure restored state of the device internal space 300, the variation of the internal pressure Pi becomes large; thus, the blockage in the vent line 90 can be detected with high accuracy.

In the present embodiment, the internal pressure sensor 136 (pressure detector) is disposed between the canister 94 and the negative pressure pump 134 (FIG. 1 and FIG. 3). If the internal pressure sensor 136 is disposed between the canister 94 and the negative pressure pump 134, the detection accuracy of the internal pressure sensor 136 to detect the internal pressure Pi may be deteriorated due to the pressure loss of the canister 94 or the like. In the present embodiment, by using the variation of the internal pressure Pi (detected value from internal pressure sensor 136) in the pressure restored state of the device internal space 300, the blockage in the vent line 90 is detected. Thus, even if the internal pressure sensor 136 is disposed between the canister 94 and the negative pressure pump 134, the blockage in the vent line 90 can be detected with high accuracy.

In the present embodiment, the monitoring device 30 (blockage detection device) includes: the discharging speed calculation unit 180 (FIG. 2) configured to calculate the discharging speed Qref of the internal fluid Fi when the negative pressure pump 134 is operated; the elapsed time calculation unit 182 configured to calculate the elapsed time Δt for the internal pressure Pi (pressure in the vent line 90) to change from the second pressure value P2 to the first pressure value P1; and the volume calculation unit 184 configured to calculate the volume V of the device internal space 300 on the basis of the variation of the internal pressure Pi before and after the purge valve 98 is opened, the discharging speed Qref, and the elapsed time Δt. Thus, the volume V of the device internal space 300 can be calculated with the simple method.

B. Modifications

Note that the present invention is not limited to the above embodiment and can employ various structures on the basis of the description in the present specification. For example, the following structures can be employed.

B-1. Application Object

In the above embodiment, description is given concerning the structure where the blockage detection device 30 is applied to the vehicle 10 (FIG. 1). It is assumed that the vehicle 10 herein described is a passenger vehicle. However, for example, from the viewpoint of detecting the blockage in the vent line 90, the present invention is not limited to this example. For example, the present invention may be applied to vehicles (conveyances) such as a ship and an airplane. Alternatively, the present invention can be applied to a manufacturing apparatus.

B-2. Detection of Blockage in Vent Line 90

In the present embodiment, the vent line blockage diagnosis control is performed by the monitoring ECU 116 mounted in the vehicle 10 (FIG. 1). However, the blockage diagnosis control itself is not necessarily performed in the vehicle 10. If the vehicle 10 can communicate with an external server, the external server may perform the blockage diagnosis control.

In the present embodiment, by comparing the volume V [L] with the volume threshold THv directly, it is determined whether the blockage in the vent line 90 has occurred (S42 in FIG. 14). However, for example, from the viewpoint of detecting the blockage in the vent line 90 on the basis of the gas information in the pressure restored state, the present invention is not limited to this example. The above example uses the internal space volume V when the internal pressure Pi becomes more than or equal to the initial pressure value Pini (S39: TRUE→S40 in FIG. 14). Alternatively, for example, it may be determined whether the volume V when a predetermined time has passed is more than or equal to the volume threshold THv. The predetermined time herein is set in order to determine the timing before the internal pressure Pi becomes more than or equal to the initial pressure value Pini.

In the present embodiment, as the pressure value used for calculating the volume V, only the detected value from the single internal pressure sensor 136 is used. However, for example, from the viewpoint of calculating or detecting the volume V, a plurality of pressure sensors can be provided. Then, the volume V can be calculated using a pressure difference between the pressures from the pressure sensors, on the basis of Bernoulli's theorem. In this case, a first pressure sensor is disposed on a part that is more on the tank 50 side than the orifice 132 (FIG. 3), and a second pressure sensor is disposed on a part that is more on the negative pressure pump 134 side than the orifice 132.

In the present embodiment, the fluid that passes the orifice 132 is the internal fluid Fi (see FIG. 3 to FIG. 5). However, for example, if the separation between the vent line 90 and the outside can be secured, the outside air may pass the orifice 132. The separation between the vent line 90 and the outside can be achieved by, for example, a combination of the switching valve 130 and other valves.

B-3. Others

In the above embodiment, some comparisons of numerals use an equal sign while others do not (S35, S39, S42 in FIG. 14, etc.). However, for example, if there is no special reason to use or not to use the equal sign (in other words, as long as effect of the present invention can be obtained), whether to use the equal sign in comparing the numerals can be set arbitrarily.

In view of this, for example, the determination as to whether the internal pressure Pi in step S35 in FIG. 14 is less than the reference pressure value Pref can be replaced by the determination as to whether the internal pressure Pi is less than or equal to the reference pressure value Pref.

The above embodiment is performed in accordance with the flowcharts in FIG. 11, FIG. 13, and FIG. 14. However, for example, the contents of the flowcharts (order of steps) are not limited to those above, as long as the effect of the present invention can be obtained. For example, in FIG. 13, step S26 may come before step S25.

What is claimed is:

1. A blockage detection device for detecting a blockage in a vent line of a fuel storage device, the fuel storage device including:
   a fuel tank; a canister; the vent line configured to connect the fuel tank and the canister;

a purge line configured to connect the canister and an intake system of an internal combustion engine and purge volatile fuel from the fuel tank or the canister to the intake system;

a purge valve provided in the purge line;

a pressure detector configured to detect internal pressure corresponding to pressure in a device internal space that is a space including the fuel tank, the vent line, and the purge line; and a negative pressure pump connected to a downstream side of the canister with respect to the fuel tank, and configured to reduce the pressure in the device internal space, wherein the blockage detection device is configured to:

open the purge valve in a state where the internal pressure of the device internal space has been reduced by operation of the negative pressure pump;

calculate gas information of the device internal space on a basis of variation of the internal pressure before and after the purge valve is opened; and detect the blockage in the vent line using the calculated gas information.

2. The blockage detection device according to claim 1, wherein the blockage detection device is configured to:

reflect, in the gas information, influence of an operation of the negative pressure pump after the purge valve is opened; and detect the blockage in the vent line using the gas information which reflects the influence.

3. The blockage detection device according to claim 1, wherein the blockage detection device is configured to detect the blockage in the vent line while the internal combustion engine is stopped.

4. The blockage detection device according to claim 1 wherein the pressure detector is disposed between the canister and the negative pressure pump.

5. The blockage detection device according to claim 1, further comprising: a discharging speed calculation unit configured to calculate discharging speed of an internal fluid when the negative pressure pump is operated; an elapsed time calculation unit configured to calculate elapsed time for the pressure in the vent line to change from a second pressure value to a first pressure value; and a volume calculation unit configured to calculate a volume of the device internal space on a basis of the variation of the internal pressure before and after the purge valve is opened, the discharging speed, and the elapsed time.

6. A blockage detection device for detecting a blockage in a vent line of a fuel storage device, the fuel storage device including:

a fuel tank;
a canister;
the vent line configured to connect the fuel tank and the canister;

a purge line configured to connect the canister and an intake system of an internal combustion engine and purge volatile fuel from the fuel tank or the canister to the intake system;

a purge valve provided in the purge line;

a pressure detector configured to detect internal pressure corresponding to pressure in a device internal space that is a space including the fuel tank, the vent line, and the purge line; and a negative pressure pump connected to a downstream side of the canister with respect to the fuel tank, and configured to reduce the pressure in the device internal space, wherein the blockage detection device is configured to:

open the purge valve in a state where the negative pressure pump is operated;

calculate gas information of the device internal space on a basis of variation of the internal pressure before and after the purge valve is opened;

detect the blockage in the vent line using the calculated gas information, calculate a volume of the device internal space on the basis of the variation of the internal pressure before and after the purge valve is opened; and detect the blockage in the vent line using the calculated volume.

7. A blockage detection method for detecting a blockage in a vent line of a fuel storage device, the fuel storage device including:

a fuel tank; a canister;

the vent line configured to connect the fuel tank and the canister;

a purge line configured to connect the canister and an intake system of an internal combustion engine and purge volatile fuel from the fuel tank or the canister to the intake system;

a purge valve provided in the purge line;

a pressure detector configured to detect internal pressure corresponding to pressure in a device internal space that is a space including the fuel tank, the vent line, and the purge line; and a negative pressure pump connected to a downstream side of the canister with respect to the fuel tank, and configured to reduce the pressure in the device internal space, the blockage detection method comprising:

a gas information calculation step of opening the purge valve in a state where the internal pressure of the device internal space has been reduced by operation of the negative pressure pump, and calculating gas information of the device internal space on a basis of variation of the internal pressure before and after the purge valve is opened; and a blockage detection step of detecting the blockage in the vent line using the calculated gas information.

\* \* \* \* \*